US011301270B2

(12) United States Patent
Levy et al.

(10) Patent No.: US 11,301,270 B2
(45) Date of Patent: *Apr. 12, 2022

(54) BROKERAGE TOOL FOR ACCESSING CLOUD-BASED SERVICES

(71) Applicant: Microsoft Technology Licensing, LLC, Redmond, WA (US)

(72) Inventors: Nir Levy, Tel Aviv (IL); Lee Stott, Manchester (GB); Justin R. Garrett, Maple Valley, WA (US); Alexander Pshul, Karmiel (IL); Moaid Hathot, Acre (IL); Libi Axelrod, Herzelia (IL); Irit Kantor, Kadima (IL); Itay Yaffe, Karmiel (IL); Amichai Vaknin, Hoshaya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/130,965

(22) Filed: Dec. 22, 2020

(65) Prior Publication Data

US 2021/0173678 A1 Jun. 10, 2021

Related U.S. Application Data

(63) Continuation of application No. 16/704,380, filed on Dec. 5, 2019, now Pat. No. 10,908,933.

(51) Int. Cl.
*G06F 9/451* (2018.01)
*G06F 8/20* (2018.01)
(Continued)

(52) U.S. Cl.
CPC ............... *G06F 9/451* (2018.02); *G06F 8/20* (2013.01); *G06F 9/5072* (2013.01); *G06F 16/9535* (2019.01)

(58) Field of Classification Search
CPC ........ G06F 9/451; G06F 16/9535; G06F 8/20; G06F 9/5072; G06F 9/44; G06F 16/953; G06F 9/5061; G06F 9/50
See application file for complete search history.

(56) References Cited

U.S. PATENT DOCUMENTS 6,978,115 B2 * 12/2005 Whitehurst .............. G09B 7/04
118/118
7,152,092 B2 * 12/2006 Beams ..................... G09B 5/00
709/204

(Continued)

*Primary Examiner* — Jung-Mu T Chuang
(74) *Attorney, Agent, or Firm* — International IP Law Group, PLLC

(57) ABSTRACT

The claimed subject matter includes techniques for providing access to a cloud-based service from a learning management system (LMS). An example method includes receiving a request from a course instructor at a brokerage engine running as an extension of the LMS. The request is a request to configure a course to be provided by a cloud-based service. The request identifies assignments to be accessed by students through the LMS and provisions cloud computing resources of the cloud-based service to be assigned to the students for completion of the assignments. The method also includes performing the request using the cloud-based service by translating, by the brokerage engine, the request to be compatible with the cloud-based service.

18 Claims, 19 Drawing Sheets

(51) Int. Cl.
*G06F 16/9535* (2019.01)
*G06F 9/50* (2006.01)

(56) References Cited

U.S. PATENT DOCUMENTS

| | | | | |
|---|---|---|---|---|
| 8,406,682 | B2* | 3/2013 | Elesseily | G09B 9/00 434/362 |
| 8,904,343 | B2* | 12/2014 | Balko | G06Q 10/06 717/104 |
| 8,924,539 | B2* | 12/2014 | Ferris | G06F 9/5072 709/224 |
| 8,931,038 | B2* | 1/2015 | Pulier | H04L 67/16 726/1 |
| 9,240,970 | B2* | 1/2016 | Holzman | H04L 12/1822 |
| 9,756,049 | B2* | 9/2017 | Soamboonsrup | H04W 12/08 |
| 9,805,050 | B2* | 10/2017 | Smith | G06F 16/178 |
| 10,623,245 | B2* | 4/2020 | Narasimhan | H04L 51/046 |
| 2001/0049087 | A1* | 12/2001 | Hale | G09B 7/02 434/350 |
| 2002/0119434 | A1* | 8/2002 | Beams | G09B 7/00 434/322 |
| 2002/0142278 | A1* | 10/2002 | Whitehurst | G09B 7/04 434/350 |
| 2005/0095569 | A1* | 5/2005 | Franklin | G09B 7/00 434/350 |
| 2009/0317786 | A1* | 12/2009 | Alcorn | G09B 5/02 434/323 |
| 2011/0154302 | A1* | 6/2011 | Balko | G06F 8/10 717/140 |
| 2011/0231899 | A1* | 9/2011 | Pulier | H04L 63/0272 726/1 |
| 2011/0269111 | A1* | 11/2011 | Elesseily | G06Q 10/10 434/362 |
| 2012/0131176 | A1* | 5/2012 | Ferris | G06F 9/5072 709/224 |
| 2012/0214147 | A1* | 8/2012 | Ernst | G09B 7/00 434/353 |
| 2012/0231437 | A1* | 9/2012 | Fakhrai | G09B 7/00 434/350 |
| 2012/0233083 | A1* | 9/2012 | Strodtman | G06Q 50/20 705/326 |
| 2013/0066940 | A1* | 3/2013 | Shao | H04L 67/1025 709/201 |
| 2013/0167111 | A1* | 6/2013 | Moore | G06F 3/0481 717/105 |
| 2013/0238729 | A1* | 9/2013 | Holzman | H04L 65/1059 709/206 |
| 2014/0272892 | A1* | 9/2014 | Rozycki | G09B 5/08 434/350 |
| 2014/0329210 | A1* | 11/2014 | Masood | G09B 7/02 434/219 |
| 2014/0379647 | A1* | 12/2014 | Smith | G06F 16/178 707/624 |
| 2015/0067171 | A1* | 3/2015 | Yum | H04L 67/2809 709/226 |
| 2015/0106723 | A1* | 4/2015 | Bertelsen | H04L 67/22 715/738 |
| 2015/0304330 | A1* | 10/2015 | Soamboonsrup | H04W 12/37 726/4 |
| 2016/0012251 | A1* | 1/2016 | Singh | G06F 21/6254 707/783 |
| 2016/0275803 | A1* | 9/2016 | Martin | G09B 5/06 |
| 2017/0293675 | A1* | 10/2017 | York | G06F 40/211 |
| 2018/0054356 | A1* | 2/2018 | Narasimhan | H04L 47/825 |
| 2018/0090022 | A1* | 3/2018 | Bouillet | G06Q 50/2057 |
| 2018/0232651 | A1* | 8/2018 | Potter | G06F 11/3438 |
| 2018/0330000 | A1* | 11/2018 | Noble | G09B 7/02 |
| 2018/0373994 | A1* | 12/2018 | Doucette | G06Q 10/1097 |
| 2019/0004876 | A1* | 1/2019 | Khakimyanov | H04L 29/06047 |
| 2019/0189020 | A1* | 6/2019 | Punia | G06N 20/20 |
| 2019/0251145 | A1* | 8/2019 | Finn | G06F 40/131 |
| 2019/0259293 | A1* | 8/2019 | Hellman | G06K 9/6257 |
| 2019/0272775 | A1* | 9/2019 | Noble | G09B 19/00 |
| 2019/0304321 | A1* | 10/2019 | Kortan | G06F 3/017 |

* cited by examiner

| University Logo | Web-Supported Academic Instruction |
| --- | --- |

Turn Editing On

Workshop on the Internet of Things (IoT)

Home / My Courses / Computer Science / Workshop on the Internet of Things (IoT)

| Syllabus | Professor Name |
| --- | --- |

Your Progress ?

Lecturer Messages

Topic 1: IoT Intro

IoT Presentation ☐

Topic 2: Project from Past Years, Examples for Controllers, Sensors and Actuators Documentation for Past Years Projects ☐
    Projects from Past Years, that are Similar to the Workshop Project for this Course with Slight Differences Vendor Website - Creator of Our Controller ☐
    The Company Creates Sensor and Controllers that We are Going to Use in the Course Controller Webpage - the Controller We are Going to Use ☐
    Tutorials, Documentation and Other Useful Links for the Device ☐ ☐

FIG. 3A

University Logo | Web-Supported Academic Instruction

Workshop on the Internet of Things (IoT)
Home / My Courses / Computer Science / Workshop on the Internet of Things (IoT) / Adding New Tool to Topic 5

Adding a New External Tool to Topic 5

Expand All

General
Activity Name..........
Preconfigured Tool..........

Automatic, Based on Tool URL
Select Content
Choose a Tool
Azure Tool - Computer Science
Azure Tool - Data Science
Azure Tool - Generic

— 304

Tool URL..........

▲ Privacy
▲ Grade
▲ Common Module Settings
▲ Restrict Access
▲ Activity Completion
▲ Tags
▲ Competencies Save and Return to Course | Save and Display | Cancel There are Required Fields in This Form Marked

FIG. 3C

IoT Assignment 1

Preferences Classroom Dashboard [Student View] [Publish]

▶ General

▼ Resources

Azure Lab | Services  Estimate        330 ➤ [2035$.000] [>]

Estimate Name    Price Level    Created (UTS)    Total

You Do Not Have Any Saved Estimates. Please Configure Products...

Your Estimate

Virtual Machines  1 D2 V3 (2vCPU (s), 8 GB RAM)x 730 Hour, Windows-... $152.62
Virtual Machines  1 D2 V3 (2vCPU (s), 8 GB RAM)x 730 Hour, Windows-... $152.62  — 328
Virtual Machines  1 D2 V3 (2vCPU (s), 8 GB RAM)x 730 Hour, Windows-... $152.62
Storage           1 D2 V3 (2vCPU (s), 8 GB RAM)x 730 Hour, Windows-... $152.62

Support
Support                                                          $152.62
[Included ▼]

Programs and Offers
Licensing Program
[(MOSP) ▼]
∞ Show Test/Prices

▶ Tutorials

FIG. 3G

IoT Assignment 1

Preferences  Classroom Dashboard                    Student View | Publish
                                                              336

▸ General

▸ Resources                                                         ∞

▾ Tutorials                                                         ∞

Course Online | Add Quiz

332 — [ IoT ]                                    Clear All Selected Tutorials

| Microst Azure IoT Strategy and... | Microst Azure IoT Strategy and... |
| 23 min • Module • 6 Units | 23 min • Module • 6 Units |

334

| Microsoft Azure IoT Strategy and Solutions  23 min • Module • 6 Units  This Module Provides an Overview  Learn More ✓ | Monitor ans Manage Your Coffee Machine with Azure IoT Central  1hr 7min • Module • 6 Units  Lear How to Create an Azure IoT Central Application  Learn More ○ | Learn How to Manage IoT Devices as an IT Admin  39 min • Module • 4 Units  With IoT Adoption on the Rise, Learn What Tools Microsoft Offers Operation  Learn More ✓ |
| Get Started with Connected Field Service for Dynamics 365 and Azure IoT  1hr 6min • Module • 7 Units  This Module Gets you Started with Connected Filed Service and Azure IoT ○ | Using IoT Central with Connected Field Service for Dynamics 365  55 min • Module • 6 Units  This Module Focuses on Using IoT Cental with Connected Field Service add-on for... ○ | Working with Connected Field Service for Dynamics 365 and Azure IoT  5hr 58min • Learning Path • 5 Modules  This Learning Path Introduces You to Connected Field Service. ○ |

▸ Autograde

FIG. 3H

| Publish | X |

⊙――②――③
Prerequisites  Summery  Deployment &
                       Confirmation General
Course Name    IoT
Description    Description...

Time

Add File
Added Files    http://GitHub...

Resources
Azure Labs    Lab Name    Lab IOT
              VM Size     Small
              VM Image    Windows 10
              Shedule     From 24/6/2019 to 1/18/2019

Tutorial
Optional Activity    Tutorial: Microsoft Azure IoT Solution

Autograde

[Back]                                    [Cancel] [Next]
                                                   342

FIG. 3J

| University Logo | Web-Supported Academic Instruction | Turn Editing On |

Workshop on the Internet of Things (IoT)

Home / My Courses / Computer Science / Workshop on the Internet of Things (IoT)

Syllabus  Professor Name

Lecturer Messages  Your Progress ?

Topic 1: IoT Intro

IoT Presentation  ☐

Topic 2: Project from Past Years, Examples for Controllers, Sensors and Actuators Documentation for Past Years Projects  ☐
   Projects from Past Years, that are Similar to the Workshop Project for this Course with Slight Differences Vendor Website - Creator of Our Controller  ☐
   The Company Creates Sensor and Controllers that We are Going to Use in the Course Controller Webpage - the Controller We are Going to Use  ☐
   Tutorials, Documentation and Other Useful Links for the Device Execute a Command on a Button Press  ☐
   Download the Code and Run the Example on Your Own Controller Device

BROKERAGE TOOL FOR ACCESSING CLOUD-BASED SERVICES

CROSS-REFERENCE TO RELATED APPLICATION

This application is a continuation of co-pending and commonly assigned U.S. patent application Ser. No. 16/704,380, filed Dec. 5, 2019, entitled "Brokerage Tool for Accessing Cloud-Based Services," which is incorporated herein in its entirety by reference.

BACKGROUND

An increasing number of software and computing functions are being performed through the use of cloud computing services. For example, academic institutions may use cloud-based services to facilitate various activities of the education process, such as generating and delivering course work, administering student tests, providing educational resources to students, tracking student information and performance, and other functions.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An embodiment provides techniques for providing access to cloud-based services. An example method includes generating a user interface form compatible with an application program, the user interface form being displayable via a user interface of the application program. The method also includes receiving a user request at a brokerage engine that runs as an extension of the application program through the user interface form. The method further includes identifying a cloud-based service to perform the request, and performing the request using the cloud-based service by translating the request to be compatible with the identified cloud-based service. The method also includes generating a new user interface form integrated with the user interface of application program, the new user interface form populated with data from the cloud-based service. Other embodiments include a computing device and one or more non-transitory computer readable media to perform the method.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIGS. 3A-L are illustrations of an example user interface in accordance with embodiments;

FIGS. 4A and 4B are illustrations of an example user interface in accordance with embodiments;

DETAILED DESCRIPTION

The present disclosure describes techniques for providing access to cloud-based services. The techniques described herein can provide users access to a wide variety of cloud-based services through a single user interface that integrates the various cloud-based services to form a seamless user experience.

One possible application of the present techniques is in the field of learning management systems. Learning management systems are becoming an important tool used by many educational institutions. However, the functionality provided by an institution's learning management system may be limited, such that various additional services used in the educational environment are provided by additional software resources. For example, various training materials used by students may be provided by a separate educational service. Additionally, the provisioning of computing resources for completion of coursework may need to be configured by the educator outside of the learning management system. As a result students and educators may be forced to access several services, each with their own subscription, user authentication requirements, user interfaces, and the like. This complicates the education process for students and educators.

The present disclosure describes a brokerage tool for that enables an application program, such as a learning management system, to be fully integrated with all of the additional services to be used by the application program. For example, the brokerage tool can enable the learning management system to be connected to a cloud computing system that integrates all of the various computing services used in the educational setting.

The brokerage tool enables the creation of a seamless digital learning platform that provides educators and students a single user interface for completion of a wide variety of educational tasks. Services provided by the learning platform include generation and delivery of course material and educational exercises, assignment submission, automatic grading and plagiarism detection, student information tracking, provisioning of computing resources, and others. Although some embodiments are described in relation to an educational platform, it will be appreciated that the described techniques may be applied to other fields.

Figure 1:
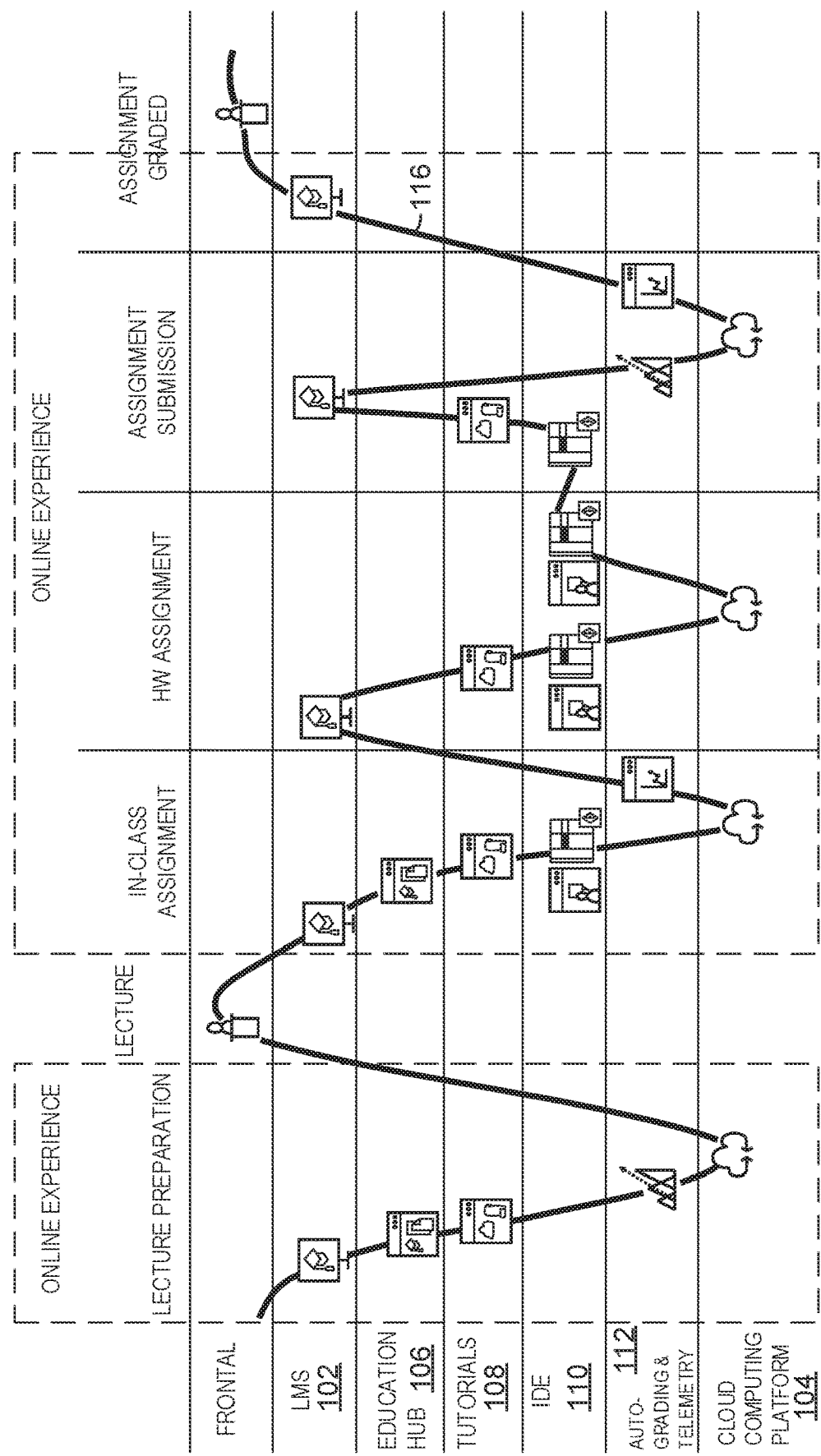
FIG. 1 is a schematic showing an example of an educational process using the educational platform in accordance with various aspects of the techniques described herein.

FIG. 1 is a schematic showing an example of an educational process using the educational platform in accordance with various aspects of the techniques described herein. The schematic 100 shown in FIG. 1 describes the educator and student interactions with the education platform, which are facilitated by the institution's learning management system (LMS) 102 and the brokerage engine described herein. The LMS 102 serves as the portal through which educators and students access the education platform. The LMS 102 may be any commercially available LMS, including proprietary LMSs such as Blackboard and open-source LMSs such as Moodle and Canvas. Examples described herein relate to computer science and data science education. However, it will be appreciated that the education platform described herein may be used in substantially any educational field.

The LMS 102 is configured to communicate with cloud computing platform 104 through the brokerage engine installed in the LMS 102. The cloud computing platform 104 can include a set of software modules implemented in hardware such as a cloud computing platform. The brokerage engine may be implemented as a software component, such as a plug-in, added to the LMS 102 as a customization. In some examples, the communication between the LMS 102 and the cloud computing platform 104 is implemented by an open standard known as the Learning Tools Interoperability (LTI) standard.

The brokerage engine allows various educational tools provided by the cloud computing platform 104 to be accessed through the LMS 102, including an education hub 106, tutorials 108, an integrated development environment (IDE) 110, auto-grading and telemetry tools 112, and others. The education hub 106 enables educators to configure assignments based on information received from the LMS 102 through the brokerage tool. The tutorials 108 can include online educational tutorials, such as online lectures. The tutorials 108 may be provided by an educational service such as Microsoft Learn. The IDE 110 is a software application that provides various software development features, such as a source code editor, debugger, and the like. The IDE 110 may be used by students to complete assigned coursework. The auto-grading and telemetry tools 112 may be used to automatically grade student assignments and log the results for each student. The telemetry tools may be used to track student grades and student progress throughout the course, as well as tracking student enrollment. In some examples, student coursework may be performed using compute resources provisioned from the cloud computing platform 104. The various educational tools can be accessed through the user interface of the LMS 102 as though they were integrated into the LMS itself. This provides educators and students with a single user interface to configure assignments, access course materials, perform coursework and submit assignments, receive grades, review course progress, and the like.

The line 116 shows the progression of the educational process using the education platform. The process begins with course preparation. To prepare the course, the educator logs in the LMS 102 and configures the course through the LMS interface using the brokerage engine. The preparation of the course may include the selection of specific tutorials, the selection of a source code editor, the selection or configuration of assignments. Preparation of the course can also include the provisioning of compute resources of the cloud computing platform 104 to the students. For example, each student may be provided access to a virtual machine through the cloud computing platform 104. In some examples, the educator may select a pre-configured course from a selection of course templates. The educator can also edit the course template and create new templates.

Once the course has been prepared, the course can be published and the education hub 106 automatically configures the course for each enrolled student in accordance with the educator's specifications. For example, a list of tutorials can be created, compute resources provisioned from the cloud computing platform, and the like. Additionally, auto grading services can be configured for each student.

Through the LMS 102, students enrolled in the class can access in-class assignments and homework assignments, submit assignments, and view grades. During in-class assignments, the student logs in the student interface provided by the LMS 102. Students may be directed to the education hub 106 by the LMS 102 for further instructions. For example, the LMS 102 may include a link corresponding to a specific course prepared by the educator. Selecting the link connects the student to the education hub 106 running in the cloud computing platform 104. The education hub 106 can then link the student to the tutorials selected by the educator. The students can also be directed to the IDE 110 for completing coursework assignments assigned by the educator. During completion of coursework, the students may be consuming the compute resources provisioned by the educator and residing in the cloud computing environment 104.

Homework assignments may be completed in similar manner. For example, students can log in to the LMS 102 and be directed to additional tutorials and assignments to be completed through the IDE 110. Homework assignments may be completed in an iterative process in collaboration with other team members, and/or teachers assistants, for example. Students may then submit completed assignments through the LMS 102. Assignments may be packaged using a distributed version-control system for tracking changes in source code, such as GIT, and delivered to the LMS 102. The LMS 102 can then initiate the auto grading and telemetry tools 112, which automatically grades the submissions and reports the results back to the LMS 102 along with other student telemetry. In some examples, the auto grading service may also include automatic cheating detection, such as plagiarism detection. The auto grading service may be provided as a software application running in the cloud computing platform 104. Assignment grades may be sent back to the LMS 102 where both students and educators can view the results.

The brokerage engine described herein enables management of course work on a per-assignment basis. However, the brokerage engine may also be used to provide course-level management. Accordingly, the brokerage engine can be configured to provide cloud-based management and telemetry for an entire course. The brokerage engine can integrate all cloud usage attributes, per student, topic, class, etc., and enable the educator (i.e. teacher, professor, teaching assistant) to configure and view pedagogical and any other course related telemetry.

Figure 2:
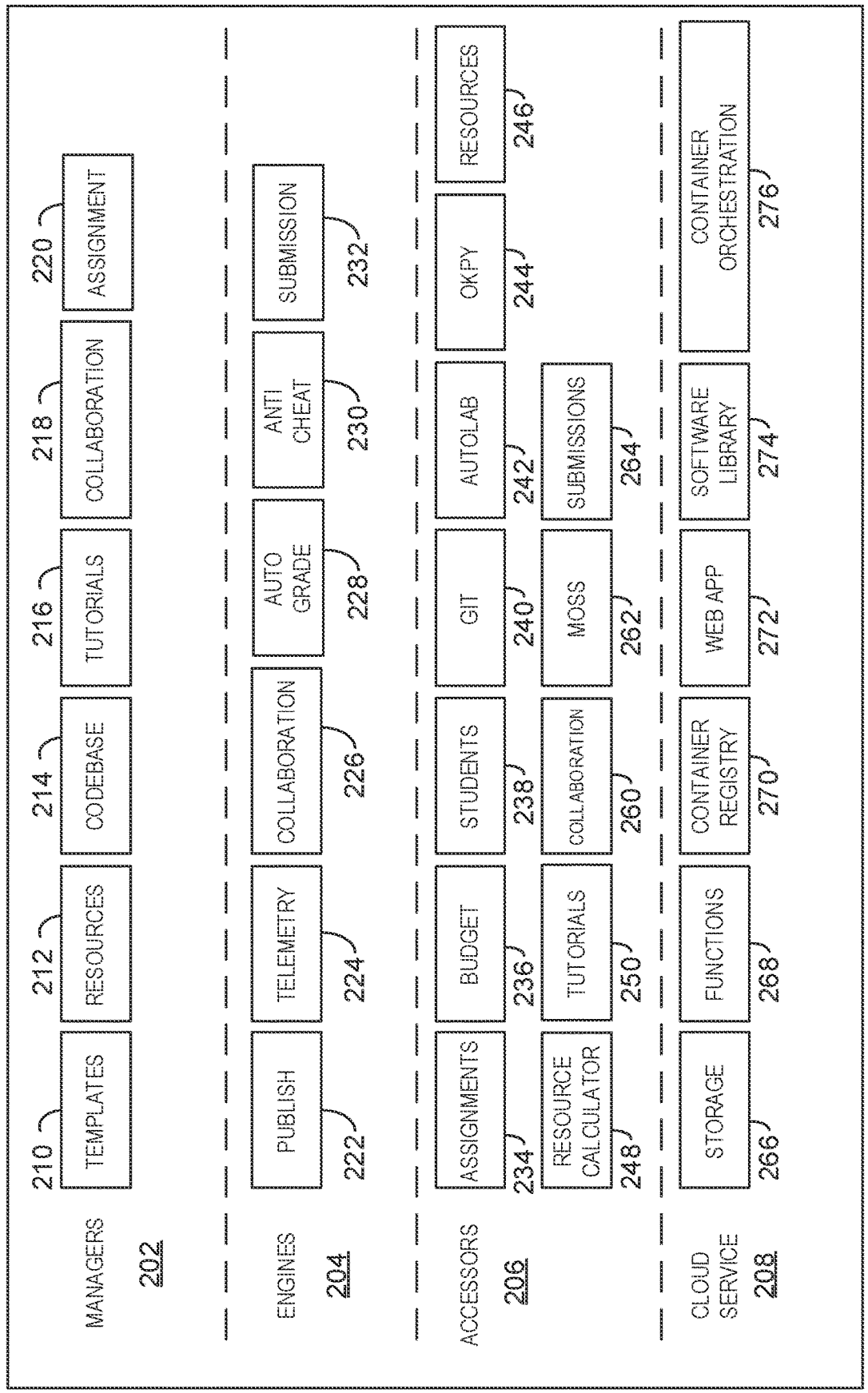
FIG. 2 is a block diagram of an education system architecture implemented in a cloud computing platform in accordance with embodiments.

FIG. 2 is a block diagram of an example of an education system architecture implemented in a cloud computing system in accordance with embodiments. It will be appreciated that the system architecture shown in FIG. 2 is only one type of system architecture that may be used to implement the features of a cloud computing system 200 in accordance with embodiments. The example cloud computing system 200 includes a manager layer 202, an engine layer 204, an accessor layer 206, and a cloud service layer 208. Each layer includes a set of autonomous micro services, each of which is a distinct software tool that performs some function of the cloud computing system 200. Each micro service is an autonomous component that can be developed, tested, and deployed separately. This prevents side effects of programming errors from leaking between the micro services.

The manager layer 202 includes micro services that manage each work request received by the LMS 102. In some examples, all of the calls between the managers are asynchronous. Work requests received by the LMS 102 can be fulfilled by the managers using the micro services of the engine layer 202. Communication between the manager layer 202 and the engine layer 204 can be implemented using a publish-subscribe mechanism, or the micro services of the manager layer 202 can implement call back contracts that are declared by the micro services in the engine layer 204. In some examples, micro services of the manager layer 202 can be implemented as a workflow, or can use a workflow to orchestrate the requests. Additionally, in some examples, micro services of the manager layer 202 can directly call to a micro service of the accessor layer 206 when only create, read, update and delete (CRUD) operations are needed.

The micro services of the engine layer 204 are responsible for the low-level execution of a request. The micro services of the engine layer 204 call lower level micro services of the accessor layer 206, such as database accessors, file system accessors and external system accessors to access resources outside of the cloud computing system. Each accessor 206 can be called by one or several specific micro services of the engine layer 204.

The micro services of the accessor layer 206 are responsible for the connection, communication, with other low-level resources, such as file systems, databases, and external systems. The micro services of the accessor layer 206 decouple the low-level resource detail from the rest of the system, thus improving the stability of the system. A change in an external systems contract, protocol or even a total replacement of a resource may be handled by adjusting only the code of micro services in the accessor layer 206. The micro services of the accessor layer 206 do not refer to engines or managers and have dependencies only with the underlying service contract, database, or external system that they communicate with.

The micro services of the manager layer 202 can include a template manager 210, a resource manager 212, a codebase manager 214, a tutorial manager 216, a collaboration manager 218, and an assignment manager 220. The template manager 210 manages all the data regarding different assignment templates and creates the assignment when initially accessed by the educator. The resources manager 212 manages the cloud computing resources for the each accessing subscription to the education platform. The codebase manager 214 provides the functionality that is used to enable students to work with software code in the performance of coding assignments. For example, the codebase manager 214 can manage the uploading of code, generation of git repositories, and others. The tutorials manager 216 manages access to and search of a database of tutorials. The collaboration manager 218 manages the use of collaboration services that facilitate online communication collaboration between students. The assignment manager 220 aggregates all the metadata for assignments and enables educators to add to or remove services from an assignment.

The micro services of the engine layer 204 can include a publish engine 222, a telemetry engine 224, a collaboration engine 226, an auto grade engine 228, an anti-cheat engine 230, and a submission engine 232. The publish engine 222 creates and manages the flow for publishing an assignment. The telemetry engine 224 aggregates data from different services to provide telemetry. Examples of telemetry include student performance such as student grades, student enrollment, and others.

The collaboration engine 226 performs the process for integrating the collaboration tools used in specific assignments. The auto grade engine 228 performs the process of integrating auto grading tools. The anti-cheat engine 230 performs the process of integrating anti-cheat tools. The submission engine 232 processes the submissions of assignments by students and collects various metadata of student submissions for the educator.

The micro services of the accessor layer 206 can include an assignments accessor 234, a budget accessor 236, student data accessor 238, git accessor 240, Autolab accessor 242, OkPy accessor 244, resources accessor 246, resource calculator accessor 248, tutorials accessor 250, teams accessor 260, MOSS accessor 262, and submissions accessor 264. The assignments accessor 234 performs CRUD operations over assignment metadata. The budget accessor 236 accesses budget details for student and educator subscriptions and can calculate price estimates for courses configured by the educator by accessing a pricing calculator API (Application Programming Interface). The student data accessor 238 accesses student data for various services, such as attendance tracking, grade tracking, and the like. The git accessor 240 performs CRUD operations over git repositories. The Autolab accessor 242 provides access to Autolab APIs. The OkPy accessor 244 provides access to OkPy APIs. Autolab and OkPy are specific auto grading software that may be accessed by the auto grade engine 228. Other auto grading software may also be implemented.

The resources accessor 246 provides operations for managing the service subscriptions and provides options for an educator to add and remove compute resources that are provided to students from the cloud computing platform. The resource calculator accessor 248 provides access to a resource calculator API that can be used to compute the cost of requested resources of the cloud computing platform. The tutorials accessor 250 provides access to the API associated with one or more tutorial providers such as Microsoft Learn. The collaboration accessor 260 provides access to collaboration resources, such as a Microsoft Teams API. The MOSS accessor 262 provides access to the MOSS API, which is a specific anti-cheat software that may be accessed by the anti-cheat engine 230. Other anti-cheat software may also be implemented. The Submissions accessor 264 enables students to submit assignments and can provide a query function for accessing specific student submissions.

The cloud services layer can include storage 266, functions 268, a container registry 270, Web applications 272, a software library 274, and container orchestration services for automating deployment, scaling, and management of applications.

The block diagram of FIG. 2 is not intended to indicate that the cloud computing system 200 is to include all of the components shown in FIG. 2. Rather, the cloud computing system 200 can include fewer or additional components not shown in FIG. 2, depending on the details of the specific implementation. For example, the cloud computing system 200 can be extended to include any number of additional tools that may be suitable for a particular course. For example, the cloud computing system 200 may include additional software tools, including word processing tools such as Microsoft Word, spreadsheet processing tools such as Microsoft Excel, presentations tools such as Microsoft Power Point and others.

Figure 3B:
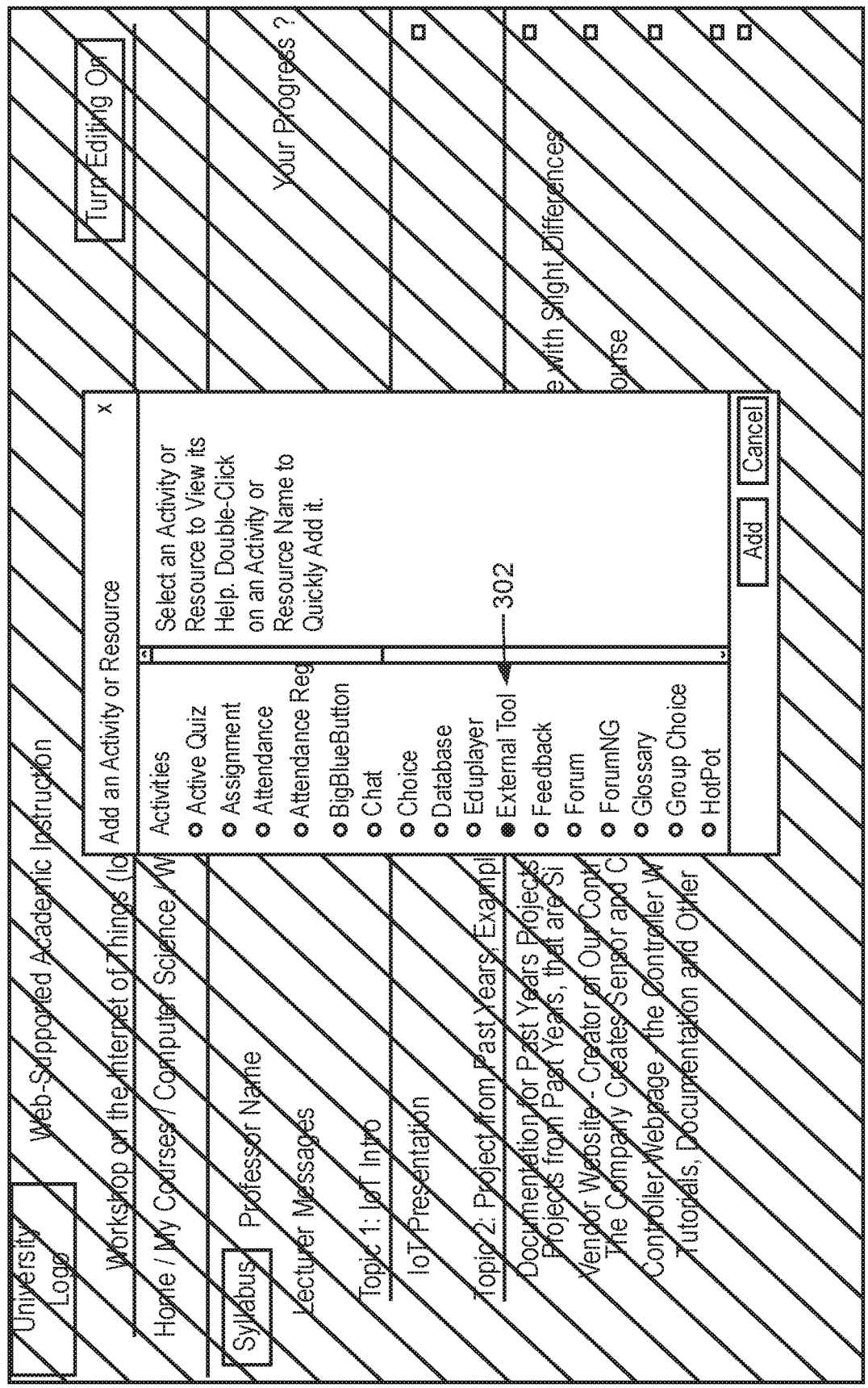

FIGS. 3A-J are illustrations of an example user interface in accordance with embodiments. The user interface shown in FIGS. 3A-Q show the user interface as it would appear to the educator.

FIG. 3A shows an example home screen of the user interface. The user interface may be generated, at least in part, by the LMS used by the educator's educational institution. As shown in FIG. 3A, the educator is currently accessing a particular course related to Internet of Things (IoT). However, it will be appreciated that this is only one example, and that various types of subject matter may be taught through the education platform. The coursework may be divided into sections referred to herein as topics. Each topic may have a set of associated resources that students will be using to complete the topic.

FIG. 3B shows an extension form in which the educator can add various services to the LMS. The extension form allows the user to add the brokerage engine to the LMS, which is shown in the form as "External Tool" 302. Selection of the external tool for addition to the LMS loads and activates the brokerage engine, which connects the LMS to the cloud computing system.

The form shown in FIG. 3C enables the educator to add new material to the course by selecting a template 302 that describes the characteristics of the course. For example, each template 302 may have a predefined set of tutorials and assignments to be included in the course. The form of FIG. 3C may be accessed, for example, by selecting a specific tab included in the home screen shown in FIG. 3A. The form is generated by the brokerage engine and is displayed to the user through the user interface of the LMS. Selection of a particular template 304 generates the form shown in FIG. 3D.

Figure 3D:

The form shown in FIG. 3D shows that the course details have been added directly to the LMS view of the course. In this example, the added course details include a course schedule 306, cloud computing services 308, a forum 310. Additional course material can also be added by the template. From the form shown in FIG. 3D, assignments can be edited and additional assignments can be added. Adding an assignment will cause the user interface to display form shown in FIG. 3E.

Figure 3E:
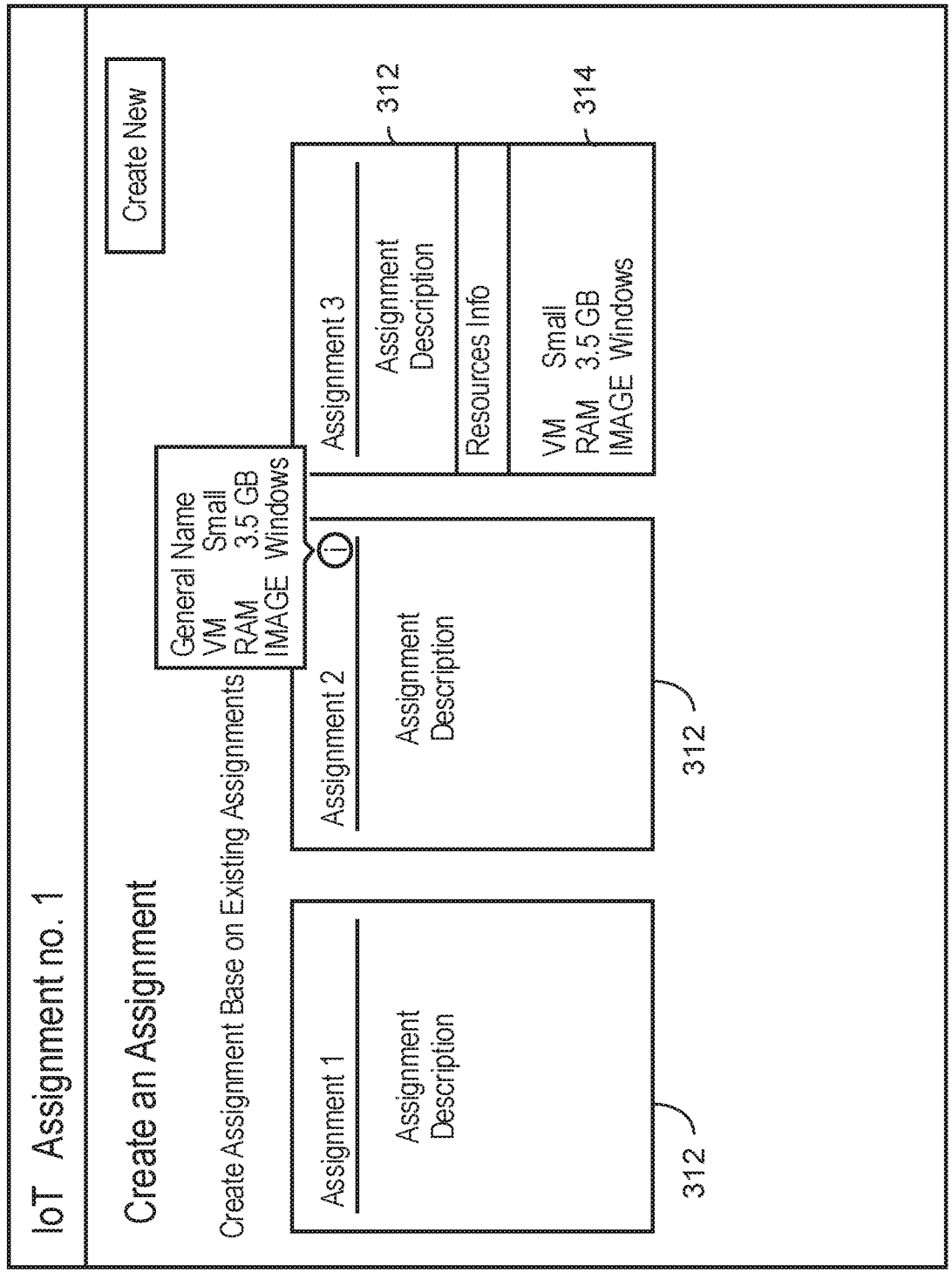

From the form of FIG. 3E, the educator can create one or more assignments 312 to be added to the course. Each of the assignments 312 may be specific learning modules or programming assignments, for example. Additionally, each assignment also shows the compute resources 314 that have been provisioned for each assignment. The compute resources may be resources of the cloud computing environment that are made accessible to the students. For example, assignment three shows that a small virtual machine instance with access to 3.5 Gigabytes of RAM and running a Windows 10Pro operating system have been associated with the assignment.

Figure 3F:

FIG. 3F shows a form in which the educator can configure the resources associated with an assignment. The form shown in FIG. 3F can be accesses by selecting a "resources" tab 316. Within the resources form, the educator can select a lab account 318, which is a service provided by the cloud computing platform for provisioning cloud compute resources. The educator can select different types of virtual machines 320 to be associated with the assignment, and different operating systems 322 to be run by the virtual machine. The educator can also define the default credentials 324 that students use to access the lab account. The educator can also define a schedule 326 for the lab, which determines when the lab is available to students.

FIG. 3G shows a form in which an estimated cost of the provisioned services is provided. The price estimate 328 includes a price for each provisioned virtual machine, storage resources, and support services. The price estimate 328 may be itemized for each student or for the whole class for each assignment. A total price estimate 330 is also provided. Based on the price estimate, the educator is able to determine whether the price is acceptable and can change the service selection accordingly. The price estimate can be calculated using the budget accessor 236 shown in FIG. 2.

FIG. 3H shows a form that enables the educator to add tutorials to the course. The educator can search for relevant tutorials by entering one or more keywords into the search parameters text box. The form then displays of all of the available tutorials 334 on the searched subject matter. The educator can then select which tutorials to add to the course from the set of available tutorials 334. After the course is defined, the educator can start the publishing process by selecting the "publish" button 336, which launches the form shown in FIG. 3I.

Figure 3I:
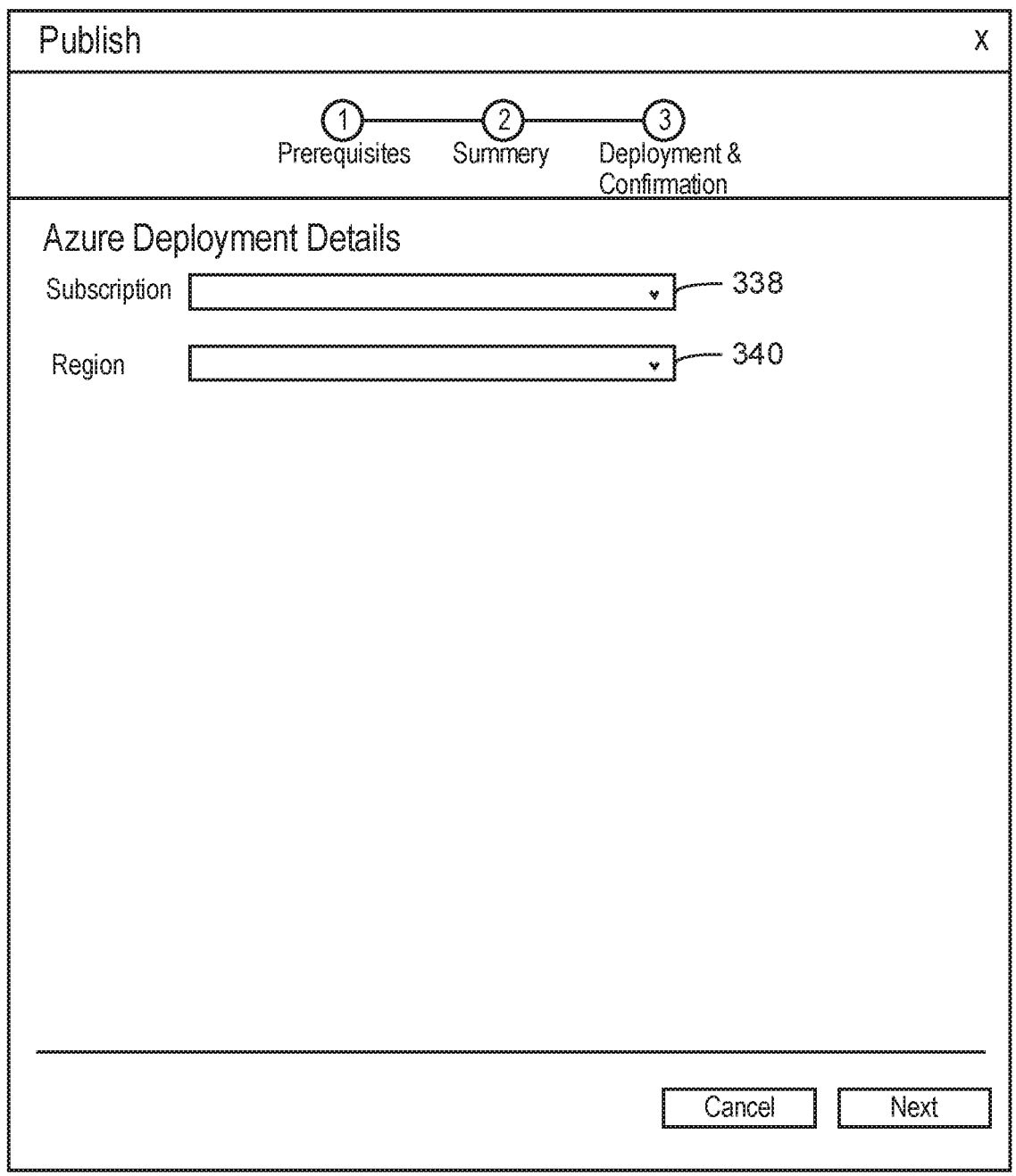

FIG. 3I shows a form that enables the educator to define a subscription and region in which to publish the course. Educators may teach a number of different courses across different faculties or different institutions. Therefore, different courses may need to be associated with a different subscription to the education platform. Additionally, the educator may be subject to requirements to maintain data in certain geographical regions. The form shown in FIG. 3I enables the educator to select the appropriate subscription 338 and region 340 for the course.

FIG. 3J provides a summary of the course. The summary describes the name and description of the course, a description of the compute resources to be used for the course, and a list of tutorials included in the course. The summary also shows a list of files that have been added to the course, which may include git files, and others. The summary also shows that the educator has selected auto grading service for grading student submissions. Selecting the "next" button 342 initiates the publishing process, as shown in FIG. 3K.

Figure 3K:
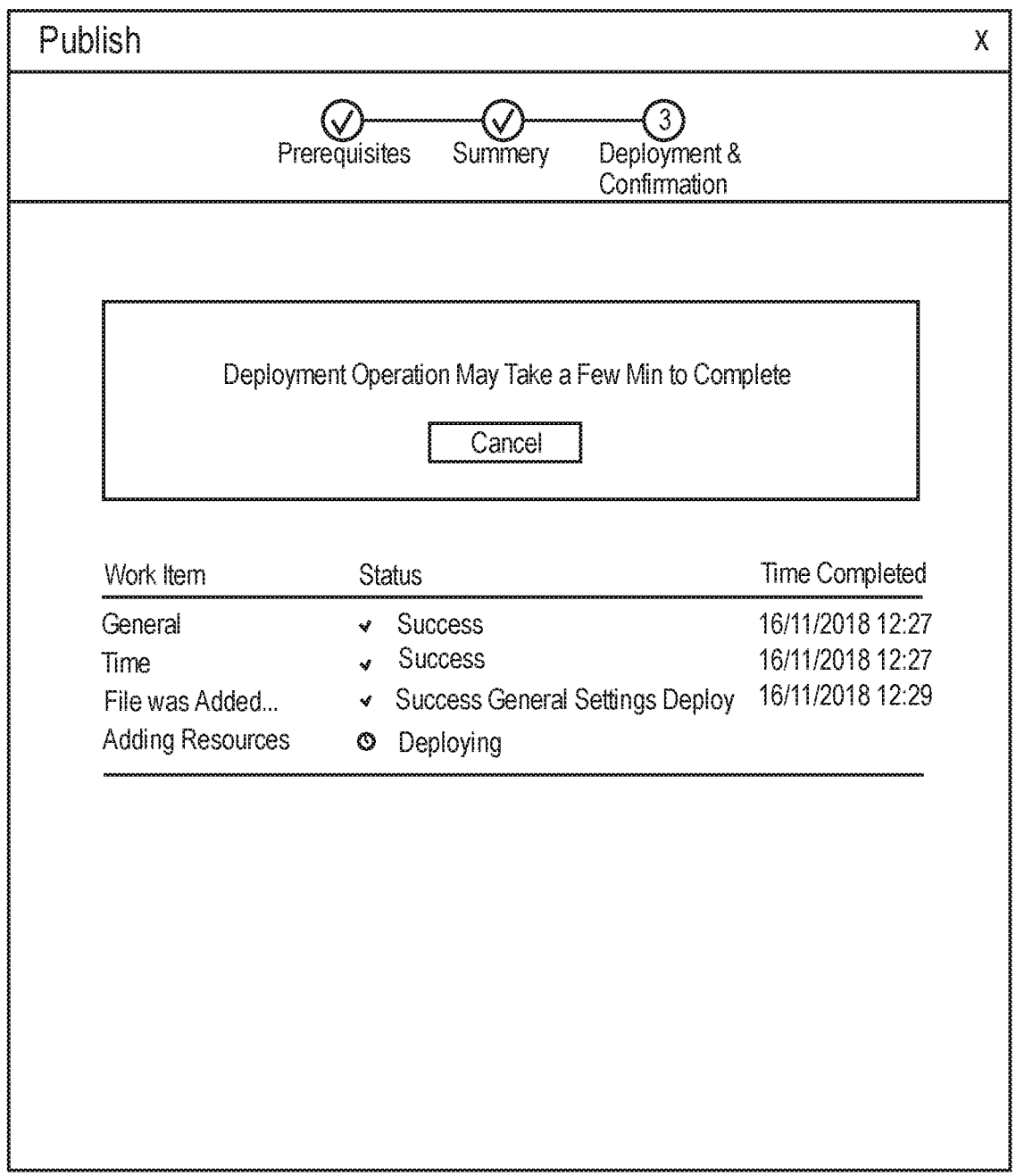
Figure 3L:
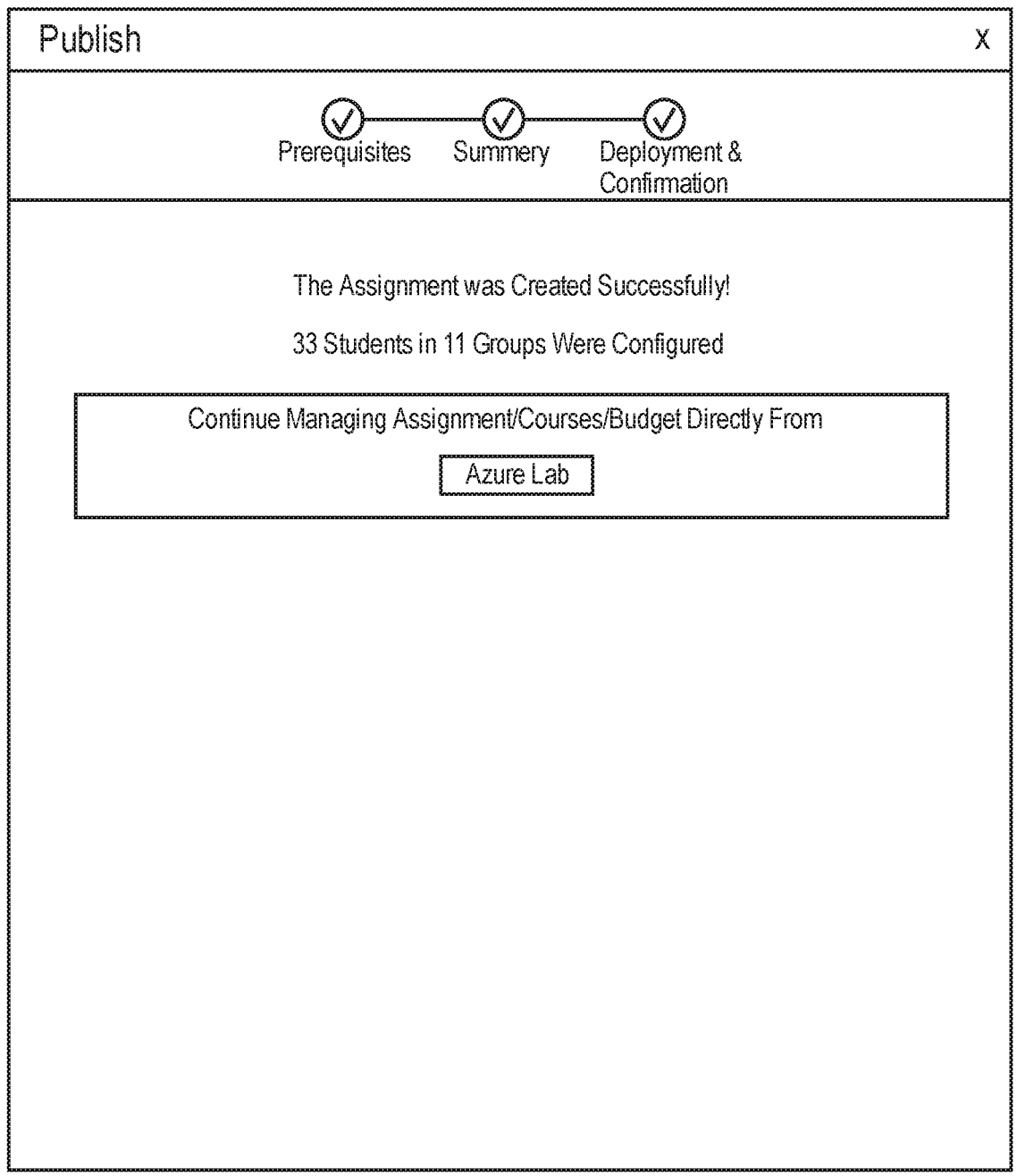

FIG. 3K shows the development of the deployment process and provides feedback to the educator as various stages of the deployment process are completed. At this point, the brokerage engine sends the course details specified by the educator to the education hub, which configures the course accordingly. Once the deployment process is complete, the user interface moves to the form shown in FIG. 3L, which confirms to the educator that the course has been successfully published to the LMS and will be available to students during the specified time frame.

In the example user interface described above, the educator is configuring resources on a per-assignment basis. However, it will be appreciated that the system described herein can also be used to configure resources on a per-course basis. For example, the educator may provision certain resources to be used by students throughout an entire course. Such resources may include a message board, programming lab resources, and others.

Figure 4B:
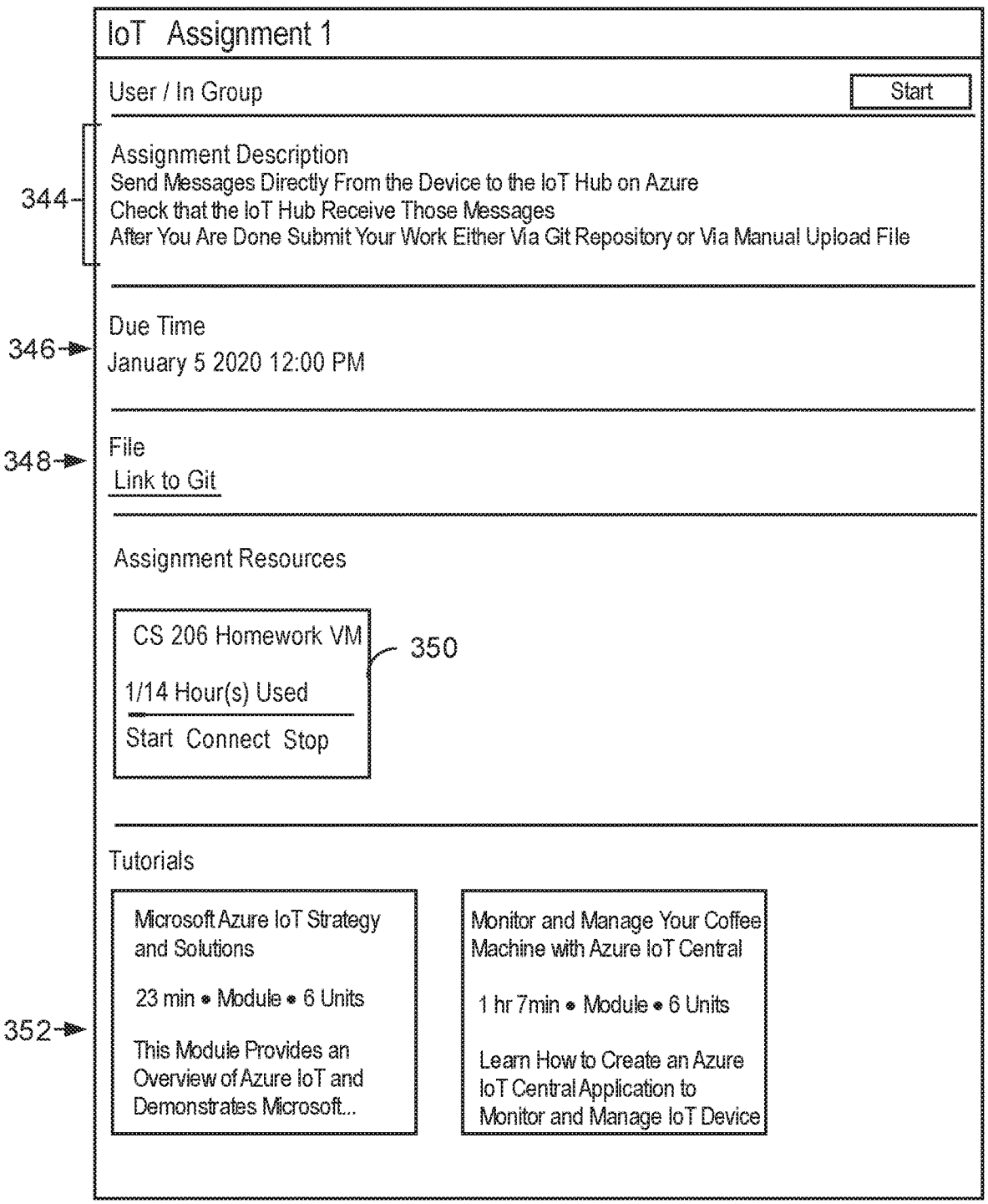

FIGS. 4A and 4B are illustrations of an example user interface in accordance with embodiments. The user interface shown in FIGS. 4A and B show the user interface as it would appear to the student.

FIG. 4A shows an example home screen of the user interface. The user interface may be generated, at least in part, by the LMS used by the educator's educational institution. As shown in FIG. 4A, the educator is currently accessing the course generated by the educator as described in relation to FIGS. 3A-L. From the form shown in FIG. 4A, the student can select a particular assignment to work on through the LMS. Selection of an assignment causes the user interface to advance to the form shown in FIG. 4B.

Form 4B shows the assignment selected by the student. At this point, the student is connected to the education platform and the assignment form is generated by the education hub.

The assignment form includes a description 344, due date 346, files 348 that the student can link to, an assignment resources tool 350, and tutorials 352, as provisioned by the educator. The assignment resources tool 350 provides information about the student's virtual machine, including how much use time is left. The assignment resources tool 350 can also be used to start or stop the virtual machine.

Figure 5:
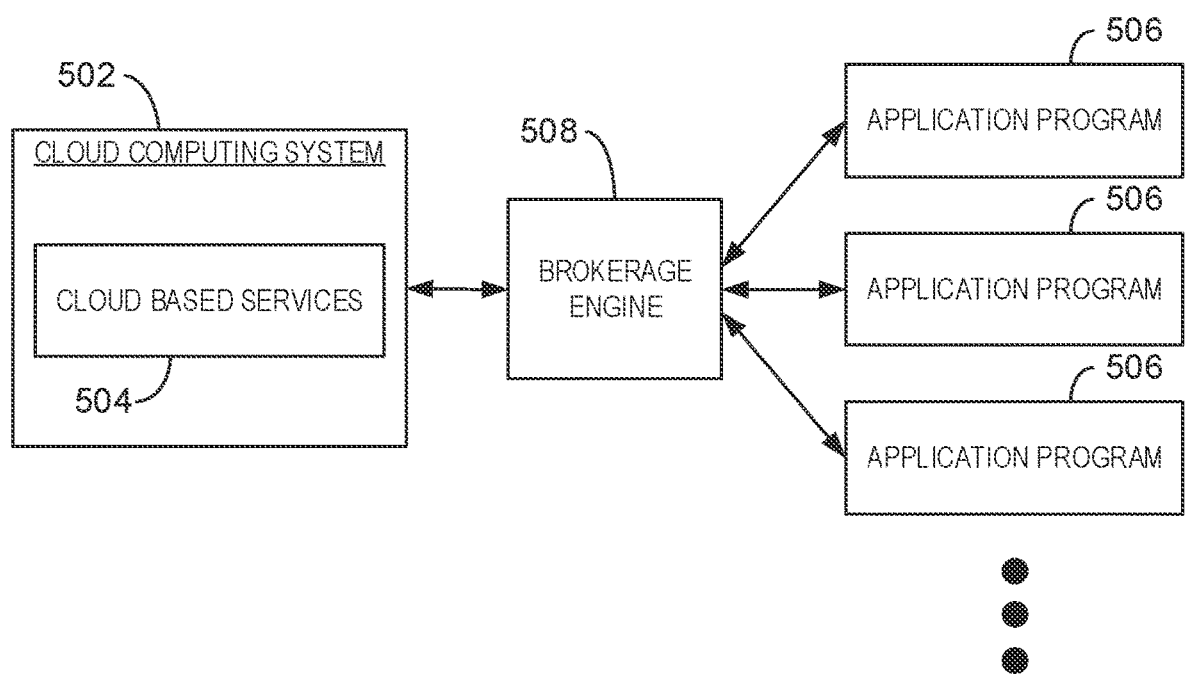
FIG. 5 is a block diagram of a system for accessing cloud-based services.

FIG. 5 is a block diagram of a system for accessing cloud-based services. The cloud-based services may be any suitable type of cloud computing services, including services provided by a learning management system. The system 500 includes a cloud computing system 502, which may be the cloud computing platform described in relation to FIG. 2. The cloud computing system 502 may provide a variety of cloud-based services 504, including services related to learning management. With reference to FIG. 2, the cloud-based services 504 may include services provided and/or managed by one or more of the managers 202, engines 204, accessors 206, and cloud services 208.

The cloud-based services 504 may be accessed by any one of a number of application programs 506. The application programs 506 may be any type of application program, including application programs related to educational services and others. For example, with reference to FIG. 1, one of the application programs 506 may be a learning management system 102 maintained by an educational institution such as a college, university, or online educational enterprise. Other possible types of application programs include programs configured to provide educational material, grading services, plagiarism detection, and others. Each of the application programs 506 may generate a user interface that is displayable to the user of the application program 506 and facilitates access to various services.

The application programs 506 are configured to access the cloud-based services 504 through the brokerage engine 508. The brokerage engine 508 may be implemented as a software extension deployed within the application program 506. For example, the user may access and launch the brokerage engine 508 through a user interface generated by the application program 506. The brokerage engine 508 can generate user interface forms that are integrated with the user interface generated by the application program 506.

The brokerage engine 508 can receive information and requests from users through the user interface forms generated by the brokerage engine 508. The brokerage tool may be activated by a link embedded in the application program 506 such as the LMS of the education institution. In some embodiments, clicking on the link will open a user interface in the LMS, which is fed by the cloud services 504. In at least some cases, user requests for one of the cloud-based services may not be compatible with the relevant cloud-based service. Accordingly, user requests received by the brokerage engine 508 can be translated into a form that is compatible with the cloud-based services 504 provided by the cloud computing system 502. For example, the brokerage engine 508 may receive the request in a format specified by the Learning Tools Interoperability (LTI) communication standard. The brokerage engine 508 interprets the request and converts it into a format that can be processed by the cloud-based services 504 as described above in relation to FIG. 2. In some embodiments, LTI communications are implemented by an LTI provider service running in the cloud computing system 502, either from the academic institution's tenant or as a separate Software as a Service (SaaS) tenant.

Requests received from users by the brokerage engine 508 may be processed different depending on the identity of the user and the type of user making the request. Examples of types of users include students and educators, i.e., teachers, instructors, professors, etc. The brokerage engine 508 can determine the type of user and process requests accordingly. For example, if the user is a student and the student request to view a course description, the brokerage engine 508 may process the request to retrieve information from the cloud-based services 504 pertinent to the individual student making the request. If the user is an educator, the brokerage engine 508 may process the request to retrieve information regarding all of the students enrolled in the course. The brokerage engine 508 may also present different types of users with different user interface forms. For example, a user interface form for a student user may include options for submitting assignments, accessing tutorials, and accessing provisioned cloud computing resources, whereas a user interface form for an educator may include options for customizing course work by adding assignments, adding tutorials, and provisioning cloud computing services to be used by the students.

An example of a request that may be received from an educator includes a request to search for tutorials related to a specified subject. The information received by the brokerage engine 508 in response to the request may include a list of tutorials being provided by the cloud-based services 504. The information may be used by the brokerage engine 508 to generate a new user interface form that includes the list of tutorials displayed to the user. Another example request from an educator includes a request to publish a course that has been configured by the educator. In response to the request, the course can be published to the application program 506 by the cloud-based services 504.

The brokerage engine 508 and the application programs 506 may be implemented in hardware or a combination of hardware and programming. For example, the brokerage engine 508 and the application programs 506 may be implemented in one or more tangible, computer-readable storage media, one or more computing devices, one or more processors, and the like. Additionally, the brokerage engine 508 and the application programs 506 may be implemented in one or more computing devices such as the one described in relation to FIG. 7. In some embodiments, the brokerage engine 508 and the application programs 506 may be implemented as tenants of the cloud computing system 502.

Figure 6:
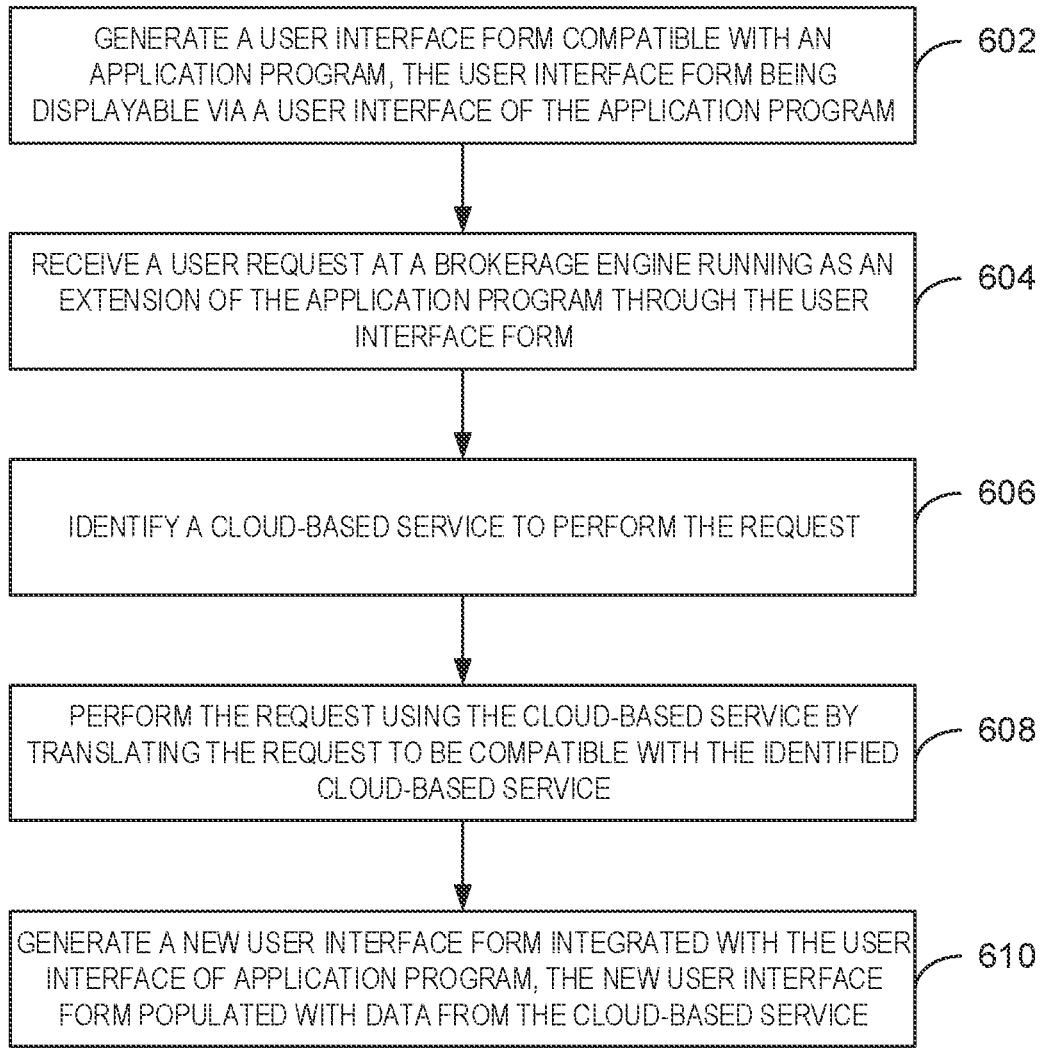
FIG. 6 is a process flow diagram summarizing a method accessing a cloud-based service.

FIG. 6 is a process flow diagram summarizing a method of accessing a cloud-based service. The method 600 may be performed by the system 500 shown in relation to FIG. 5. In some examples, the method 600 is performed to access educational services deployed in a cloud computing platform such as the cloud computing system 200 of FIG. 2 and the cloud computing system 502 of FIG. 5. The process may begin at block 602.

At block 602, a user interface form compatible with an application program is generated by the brokerage engine, such that the user interface form is displayable via a user interface of the application program. In some embodiments, the user interface form is integrated with a user interface of a learning management system used by an educational institution. The user interface form may be generated in response to user interactions with the user interface of the learning management system without the user leaving the learning management system to log in to another service.

At block 604, a user request is received at the brokerage engine, which is running as an extension of the application program through the user interface form. The user may be an educator, student, administrator, and the like. The request may be related to defining course work, the completion of assignments, the submission of assignments, viewing student telemetry, and others.

At block 606, a cloud-based service is identified to perform the request. The request may be include a unique request identifier code that identifies the type of request. The cloud computing system can determine the cloud services used to process the request based on the request identifier.

At block 608, the request is processed using the cloud-based service by translating the request to be compatible with the identified cloud-based service. For example, the request may be translated by the brokerage engine from the LTI communication standard to a communication protocol used by the cloud-based service. The brokerage engine may then submit the translated request to the cloud computing system associated with the cloud-based service. The request can include information received from the user via the user interface form. Additionally, the brokerage engine can identify a user type based on context of the request, such as whether the user is a student or educator. With reference to FIG. 2, the request may be received by the appropriate manager service 202, which processes the work request by engaging the appropriate engines 204 and accessors 206.

In some examples, the request may be a request to publish a course according to course specifications provided by an educator. In response to the request, the cloud-based service can publish the course to the learning management system. The course specifications can include a resource specification describing resources provisioned from the cloud computing system and assigned to students. The course specifications can also include identification of an auto grading service or anti cheating service to be automatically applied to student submissions. In some examples, the request may be a request for data such as a list of available tutorials that can be added to a course, or a cost estimate for resources to be provisioned from the cloud computing system and assigned to students. The request may also be a request by a student to access tutorials and assignment resources or submit an assignment.

At block 608, a new user interface form is generated and integrated with the user interface of application program. The new user interface form may be populated with data received from the cloud-based service in response to the request. For example, the data can be list of tutorials, a list of coursework to be completed, a verification that an assignment was submitted or that a course was published, student telemetry, and the like. The new user interface form can be generated by the brokerage engine, which receives the data from the cloud computing system in response to the work request. The new user interface form may also be selected based on the user type determined at block 608.

The method 600 should not be interpreted as meaning that the blocks are necessarily performed in the order shown. Furthermore, fewer or greater actions can be included in the method 600 depending on the design considerations of a particular implementation.

Figure 7:
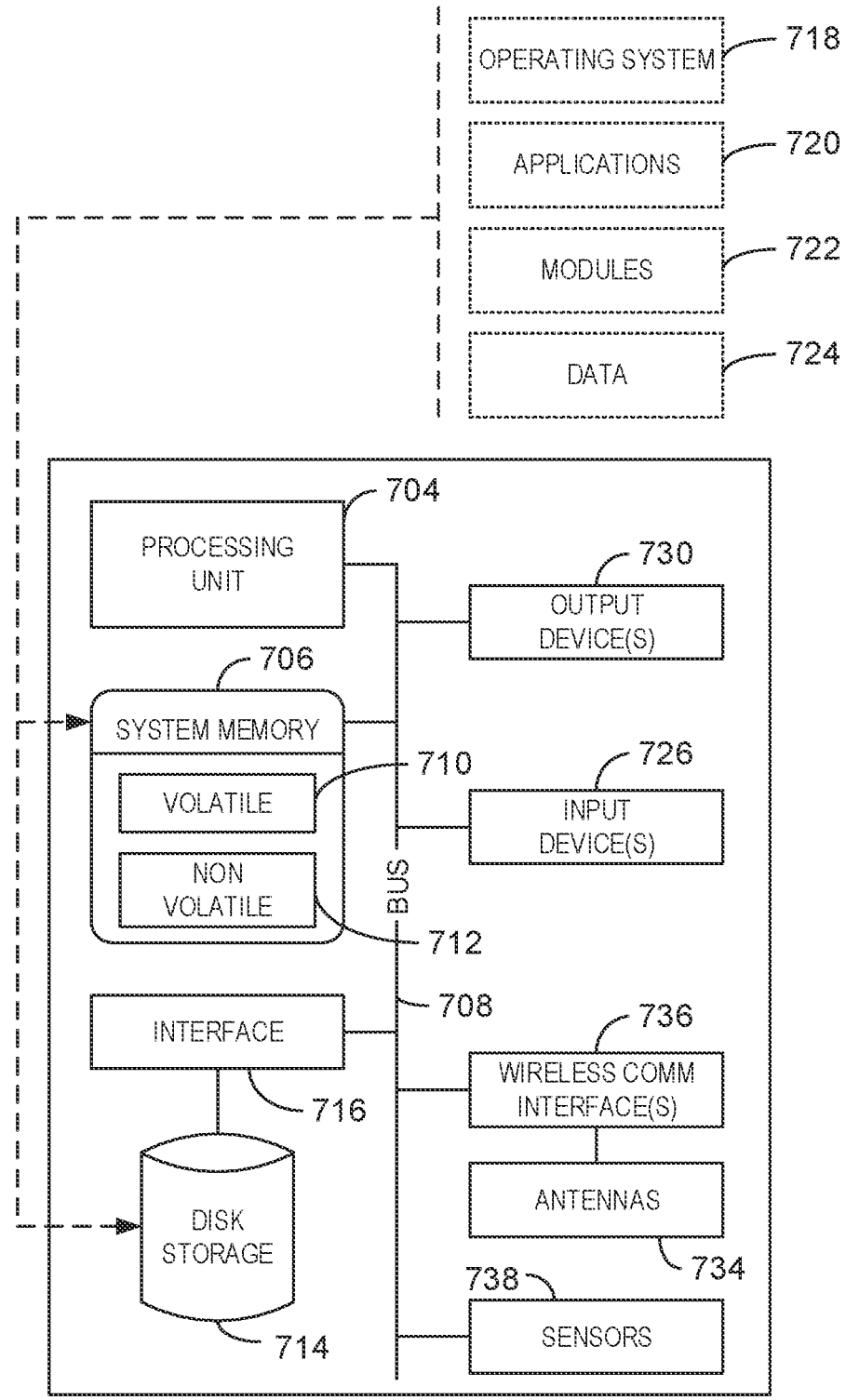
FIG. 7 is a block diagram of an exemplary computing device configured for implementing various aspects of the techniques described herein.

FIG. 7 is a block diagram of an exemplary computing device configured for implementing various aspects of the techniques described herein. FIG. 7 is intended to provide a brief, general description of a computing architecture in which the various techniques described herein may be implemented. While the claimed subject matter has been described above in the general context of computer-executable instructions of a computer program that runs in the operating system environment and hardware of a computing device computer, the claimed subject matter also may be implemented in different combinations of program modules. Generally, program modules include routines, programs, components, data structures, or the like that perform particular tasks or implement particular abstract data types.

The computing device 700 is an example of a computing device that can be used to implement any of the techniques described above. For example, the exemplary computing device 700 may be a laptop computer, desktop computer, tablet computer, or smart phone, for example. The exemplary computing device 700 includes a processing unit 704, a system memory 706, and a system bus 708.

The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure, including the memory bus or memory controller, a peripheral bus or external bus, and a local bus using any variety of available bus architectures known to those of ordinary skill in the art. The system memory 706 includes computer-readable storage media that includes volatile memory 710 and nonvolatile memory 712.

The BIOS or EUFI, containing the basic routines to transfer information between elements within the computing device 700, such as during start-up, is stored in nonvolatile memory 712. By way of illustration, and not limitation, nonvolatile memory 712 can include read only memory (ROM), programmable ROM (PROM), electrically programmable ROM (EPROM), electrically erasable programmable ROM (EEPROM), or flash memory.

Volatile memory 710 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computing device 700 also includes other computer-readable media, such as removable/non-removable, volatile/non-volatile computer storage media. FIG. 7 shows, for example a disk storage 714. Disk storage 714 includes, but is not limited to, devices like a magnetic disk drive, floppy disk drive, tape drive, Jaz drive, Zip drive, LS-210 drive, flash memory card, or memory stick.

In addition, disk storage 714 can include storage media separately or in combination with other storage media including, but not limited to, an optical disk drive such as a compact disk ROM device (CD-ROM), CD recordable drive (CD-R Drive), CD rewritable drive (CD-RW Drive), a digital versatile disk ROM drive (DVD-ROM), or cloud storage. To facilitate connection of the disk storage devices 714 to the system bus 708, a removable or non-removable interface is typically used such as interface 716.

It is to be appreciated that FIG. 7 describes software that acts as an intermediary between users and the basic computer resources described in the suitable computing device 700. Such software includes an operating system 718. Operating system 718, which can be stored on disk storage 714, acts to control and allocate resources of the computing device 700.

System applications 720 take advantage of the management of resources by operating system 718 through program modules 722 and program data 724 stored either in system memory 706 or on disk storage 714. It is to be appreciated that the claimed subject matter can be implemented with various operating systems or combinations of operating systems.

A user enters commands or information into the computing device 700 through input devices 726. Input devices 726 include, but are not limited to, a pointing device, such as, a mouse, trackball, stylus, touch screens, a keyboard, a microphone, a joystick, a digital camera, a digital video camera, and the like. The computing device 700 also includes output devices 730, such as display screens, speakers, and others.

The computing device 700 also includes one or more wireless communication interfaces 736. The wireless communication interfaces 736 refers to the hardware and software employed to connect the wireless communication interfaces 736 to the bus 708. The wireless communication interfaces 736 can include one or a combination of WiFi interfaces, Bluetooth interfaces, NFC interfaces, and cellular interfaces such as 3G, 4G, 5G, and LTE, among others.

Some of the associated figures describe concepts in the context of one or more structural components, variously referred to as functionality, modules, features, elements, or the like. The various components shown in the figures can be implemented in any manner, such as software, hardware, firmware, or combinations thereof. In some implementations, various components reflect the use of corresponding components in an actual implementation. In other implementations, any single component illustrated in the figures may be implemented by a number of actual components. The depiction of any two or more separate components in the figures may reflect different functions performed by a single actual component. FIG. 7, discussed herein, provides details regarding one computing device that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media include physical hardware devices, such as magnetic storage devices, hard disk, floppy disk, magnetic strips, optical disk, compact disk (CD), digital versatile disk (DVD), smart cards, flash memory devices, among others. In contrast, computer-readable media, i.e., not storage media, may include communication media such as transmission media for wireless signals and the like.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for providing access to a cloud-based service from a learning management system (LMS), the method comprising: generating, by a brokerage engine running as an extension of the LMS, a user interface form to be accessed through a user interface of the LMS; receiving, at the brokerage engine, a request from a course instructor through the user interface form, the request to configure a course to be provided by the cloud-based service, wherein the request identifies assignments to be accessed by students through the LMS and provisions cloud computing resources of the cloud-based service to be assigned to the students for completion of the assignments; performing the request using the cloud-based service by translating, by the brokerage engine, the request to be compatible with the cloud-based service; and receiving, at the brokerage engine, a verification from the cloud-based service that the request has been performed.

2. The method of claim 1, wherein the LMS is one of a plurality of application programs that access the brokerage engine, each of the plurality of application programs having a different user interface.

3. The method of claim 1, wherein the request is not compatible with the cloud-based service.

4. The method of claim 1, wherein the user interface form generated by the brokerage engine is displayed via the user interface of the LMS.

5. The method of claim 1, wherein the request is received in a format specified by a Learning Tools Interoperability (LTI) communication standard.

6. The method of claim 1, wherein the brokerage engine identifies a user type based on context of the request and wherein the user type can be a student user type or an instructor user type.

7. The method of claim 6, wherein the brokerage engine is to generate the user interface form based, at least in part, on the user type.

8. The method of claim 1, comprising receiving a second request at the brokerage engine, wherein the second request is a request to search for tutorials related to a specified subject, a list of tutorials being provided by the cloud-based service through another user interface form generated by the brokerage engine.

9. The method of claim 1, comprising receiving a second request at the brokerage engine, wherein the second request is a request to publish the course according to course specifications received from the course instructor, and wherein the course is published to the LMS by the cloud-based service.

10. The method of claim 1, comprising receiving a second request at the brokerage engine, wherein the second request is a request to supply a cost estimate for the cloud computing resources to be provisioned from the cloud-based service.

11. A computing system for accessing a cloud-based service from a learning management system (LMS), the computing system comprising: one or more processors to: generate, by a brokerage engine running as an extension of the LMS, a user interface form to be accessed through a user interface of the LMS; receive, at the brokerage engine, a request from a course instructor through the user interface form, the request to configure a course to be provided by the cloud-based service, wherein the request identifies assignments to be accessed by students through the LMS and provisions cloud computing resources of the cloud-based service to be assigned to the students for completion of the assignments; perform the request using the cloud-based service by translating, by the brokerage engine, the request to be compatible with the cloud-based service; and receive, at the brokerage engine, a verification from the cloud-based service that the request has been performed.

12. The computing system of claim 11, wherein the LMS is one of a plurality of application programs that access the brokerage engine, each of the plurality of application programs having a different user interface.

13. The computing system of claim 11, wherein the request is not compatible with the cloud-based service.

14. The computing system of claim 11, wherein the request is received in a format specified by a Learning Tools Interoperability (LTI) communication standard.

15. The computing system of claim 11, wherein the brokerage engine identifies a user type based on context of the request and wherein the user interface form is generated by the brokerage engine based, at least in part, on the user type.

16. The computing system of claim 11, the one or more processors to receive a second request at the brokerage engine, wherein the second request is a request to search for tutorials related to a specified subject, a list of tutorials being provided by the cloud-based service through another user interface form generated by the brokerage engine.

17. The computing system of claim 11, the one or more processors to receive a second request at the brokerage engine, wherein the second request is a request to publish the course according to course specifications received from the course instructor, and wherein the course is published to the LMS by the cloud-based service.

18. The computing system of claim 11, the one or more processors to receive a second request at the brokerage engine, wherein the second request is a request to supply a cost estimate for the cloud computing resources to be provisioned from the cloud-based service.

* * * * *